United States Patent
Bremer et al.

(10) Patent No.: US 6,647,058 B1
(45) Date of Patent: Nov. 11, 2003

(54) PERFORMANCE CUSTOMIZATION SYSTEM AND PROCESS FOR OPTIMIZING XDSL PERFORMANCE

(75) Inventors: Gordon Bremer, Clearwater, FL (US); Craig Matthews, Tinton Falls, NJ (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/102,176

(22) Filed: Jun. 22, 1998

Related U.S. Application Data (60) Provisional application No. 60/050,564, filed on Jun. 23, 1997.

(51) Int. Cl.[7] .............................. H04B 1/38; H04B 3/46
(52) U.S. Cl. ..................... 375/222; 375/225; 375/227
(58) Field of Search ................................. 375/219, 222, 375/377, 225, 227; 370/282; 455/67.1, 67.3

(56) References Cited

U.S. PATENT DOCUMENTS

| | | | |
|---|---|---|---|
| 5,150,387 A | | 9/1992 | Ywshikawa et al. ......... 375/122 |
| 5,671,250 A | | 9/1997 | Bremer et al. .............. 375/222 |
| 5,726,765 A | | 3/1998 | Yosgida et al. ............. 358/412 |
| 5,802,446 A | | 9/1998 | Giorgi et al. ................. 455/69 |
| 5,852,633 A | * | 12/1998 | Levin et al. ................. 375/130 |
| 5,991,269 A | * | 11/1999 | Williamson et al. ........ 370/241 |
| 5,991,329 A | * | 11/1999 | Lomp et al. ................. 375/130 |
| 6,061,427 A | * | 5/2000 | Ryoo .............................. 379/1 |
| 6,094,459 A | * | 7/2000 | Kao et al. .................... 375/295 |
| 6,101,223 A | * | 8/2000 | Betts ........................... 375/261 |
| 6,111,936 A | * | 8/2000 | Bremer ......................... 379/28 |
| 6,154,524 A | * | 11/2000 | Bremer ......................... 379/27 |

* cited by examiner

*Primary Examiner*—Young T. Tse
(74) *Attorney, Agent, or Firm*—Thomas, Kayden, Horstemeyer & Risley, LLP (57) ABSTRACT

A system and process for customizing the performance of an xDSL communication system in which a transmitting modem and a receiving modem will negotiate a performance parameter for adjustment. The receiving modem measures the signal to noise ratio on the xDSL loop and, based on that measurement, sends a request to the transmitting modem to make a specific adjustment to the selected performance parameter. The transmitting modem will make the adjustment upon receipt of the request from the receiving modem. In a preferred embodiment, the modems will choose either the data rate or the transmission power level as the performance parameter for adjustment. In a multiple xDSL system in which the xDSLs affect each others' performance through crosstalk, the present invention allows a first modem pair to instigate a transmission power reduction, which will in turn allow a second modem pair to either increase its present data rate or decrease its transmission power. Through this combination of transmission power adaptation and data rate adaptation, it is possible to reduce the performance variance between the individual communication sessions or customize the performance profile according to specific customer requirements.

29 Claims, 5 Drawing Sheets

Fig. 1

Prior Art

PERFORMANCE CUSTOMIZATION SYSTEM AND PROCESS FOR OPTIMIZING XDSL PERFORMANCE

CROSS REFERENCE TO RELATED APPLICATION

This application claims the benefit of U. S. Provisional Application No. 60/050,564, entitled"Power Adaptive xDSL," filed Jun. 23, 1997, which is incorporated herein by reference.

BACKGROUND OF THE INVENTION

The present invention relates generally to the field of digital subscriber lines (DSLs), and more particularly, to a performance customization system and method for optimizing DSL performance as measured by such factors as throughput, power consumption, and loop length.

With the explosion in the growth of Internet usage among both businesses and households, telephone companies have been pressured to provide affordable, high bandwidth access that will support high-speed multimedia services, such as video on demand, high speed Internet access, and video conferencing. To meet this demand, telephone companies are increasingly turning to DSL technology. DSL, while having several different embodiments, can provide throughput rates over 400 times faster than that available through traditional 14.4 kbps modems. For example, the following manifestations of DSL technology are either available today or are currently being tested on a trial basis: Asymmetric Digital Subscriber Line (ADSL), which has a throughput of 32 kbps to 8.192 Mbps downstream to the customer and 32 kbps to 1.088 Mbps upstream to the network; Rate Adaptive Asymmetric Digital Subscriber Line (RADSL), which is a rate adaptive variation of ADSL; High-bit-rate Digital Subscriber Line (HDSL), which offers full duplex throughput at T1 (1.544 Mbps) or E1 (2.048 Mbps) data rates; Symmetric Digital Subscriber Line (SDSL), which provides bi-directional throughput at data rates ranging from 160 Kbps–2.084 Mbps; and Very high-bit-rate Digital Subscriber Line (VDSL), which provides high data rates for customers close to the central office (e.g., 51 Mbps for subscribers within 1000 feet). But most importantly, xDSL offers these high data rates over a standard copper telephone line. Thus, with such a large, embedded copper network already in place, network operators view xDSL technology as a means for extending the life of their investment in copper by many years.

Inasmuch as xDSL is deployed over the copper network, it is susceptible to the same unwanted noise signals that plague traditional copper based communication systems. Noise can be generated by components both internal to the communication system, such as resistors and solid state devices, and sources external to the communication system, such as atmospheric noise, high-voltage power lines and electric motors.

It is well known from information theory that the capacity of a channel (i.e., maximum data rate) is directly related to the logarithm of the ratio of the signal power to the noise power on the channel. Therefore, to support the high data rates associated with xDSL, it would seem desirable to boost transmission power levels to boost the signal to noise ratio. As discussed in the foregoing, however, most xDSL systems operate across a broad range of data rates. Thus, if the transmission power level is statically set to support the highest rate possible, this will result in a waste of power for data sessions running at lower throughputs. Moreover, high transmission power levels unfortunately contribute to a phenomenon known as crosstalk, which is perhaps the most common and troubling source of noise in a network.

Crosstalk is defined as the cross coupling of electromagnetic energy between adjacent copper loops in the same cable bundle or binder. Crosstalk can be categorized in one of two forms: Near end crosstalk, commonly referred to as NEXT, is the most significant because the high energy signal from an adjacent system can induce relatively significant crosstalk into the primary signal. The other form is far end crosstalk or FEXT. FEXT is typically less of an issue because the far end interfering signal is attenuated as it traverses the loop. Crosstalk is a dominant factor in the performance of many systems. As a result, xDSL system performance is often stated relative to "in the presence of other systems" that may introduce crosstalk. Therefore, in central office (CO) environments where many xDSL loops or other circuits are bundled together in the same cable binder, it is often desirable to minimize transmit power levels to the lowest levels possible that will still support the desired data rates to reduce the effects of crosstalk between the loops.

Alternatively, where maximum throughput is sought, it becomes desirable to maintain the transmit power level of a given xDSL communication session thereby allowing the data rate to be maximized within the limitations imposed by the noise characteristics of the channel. Optimization of xDSL performance in a central office environment would typically require a combination of both power reduction on some channels and increased throughput or data rates on other channels.

In addition to crosstalk, there may be other reasons to adapt power levels. One of these is to reduce unwanted noise created by the system itself. Certain impairments on the copper loop, such as bridged taps (an unterminated parallel length of wire) may create reflections and distortion energy that can reduce the overall performance of the system. Reducing the power in a frequency band that creates distortion energy or increasing the power in a band that does not create distortion energy can improve the performance of the overall system.

In view of the foregoing discussion, what is sought is an xDSL system and process that dynamically adjust the transmit power levels, data rates, and other defined performance parameters of one or more specific communication sessions to customize overall system performance.

SUMMARY OF THE INVENTION

Certain advantages and novel features of the invention will be set forth in the description that follows and will become apparent to those skilled in the art upon examination of the following or may be learned with the practice of the invention.

The present invention is generally directed to a performance customization system and process for optimizing xDSL performance. Broadly stated, an improved receiving modem according to the present invention includes negotiating means that the receiving modem uses to negotiate with a transmitting modem to select a particular xDSL performance parameter to be optimized. In addition, the receiving modem includes means that are used to calculate the signal to noise ratio on the xDSL. Finally, the receiving modem includes means capable of requesting an adjustment in the selected performance parameter.

According to another aspect of the invention, an improved transmitting modem is disclosed that includes negotiating means used to negotiate with a receiving modem to select an xDSL performance parameter to be optimized. The transmitting modem further includes means responsive to performance parameter adjustment requests that are sent from a receiving modem. Further means are included in the transmitting modem for making the requested adjustment to the xDSL performance parameter.

The invention can also be viewed as providing a method for customizing the performance characteristics of an xDSL receiving modem. In this regard, the method can be broadly summarized by the following steps: The receiving modem negotiates with a transmitting modem to select an xDSL performance parameter for optimization. A signal to noise ratio is calculated and, based on this result, an adjustment request is made for the selected xDSL performance parameter.

Similarly, the invention provides a method for customizing the performance characteristics of an xDSL transmitting modem. The method can be broadly summarized as follows: The transmitting modem negotiates with a receiving modem to select an xDSL performance parameter for optimization. An adjustment request for the selected xDSL performance parameter is received and, based on this request, the performance parameter is adjusted.

According to a preferred embodiment of the invention, the modems will choose either the data rate or the transmission power level as the performance parameter for adjustment. The non-selected performance parameter is assigned a fixed value while the selected performance parameter will undergo adjustment until the system operates at a data rate that is marginally supported by the transmission power level.

In a multiple xDSL system in which the xDSLs affect each others' performance through crosstalk, the present invention allows a first modem pair to instigate a transmission power reduction, which will in turn allow a second modem pair to either increase its present data rate or decrease its transmission power. Through this combination of transmission power adaptation and data rate adaptation, it is possible to reduce the performance variance between the individual communication sessions or customize the performance profile according to specific customer requirements.

Additional advantages will become apparent from a consideration of the following description and drawings:

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE INVENTION

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 1:
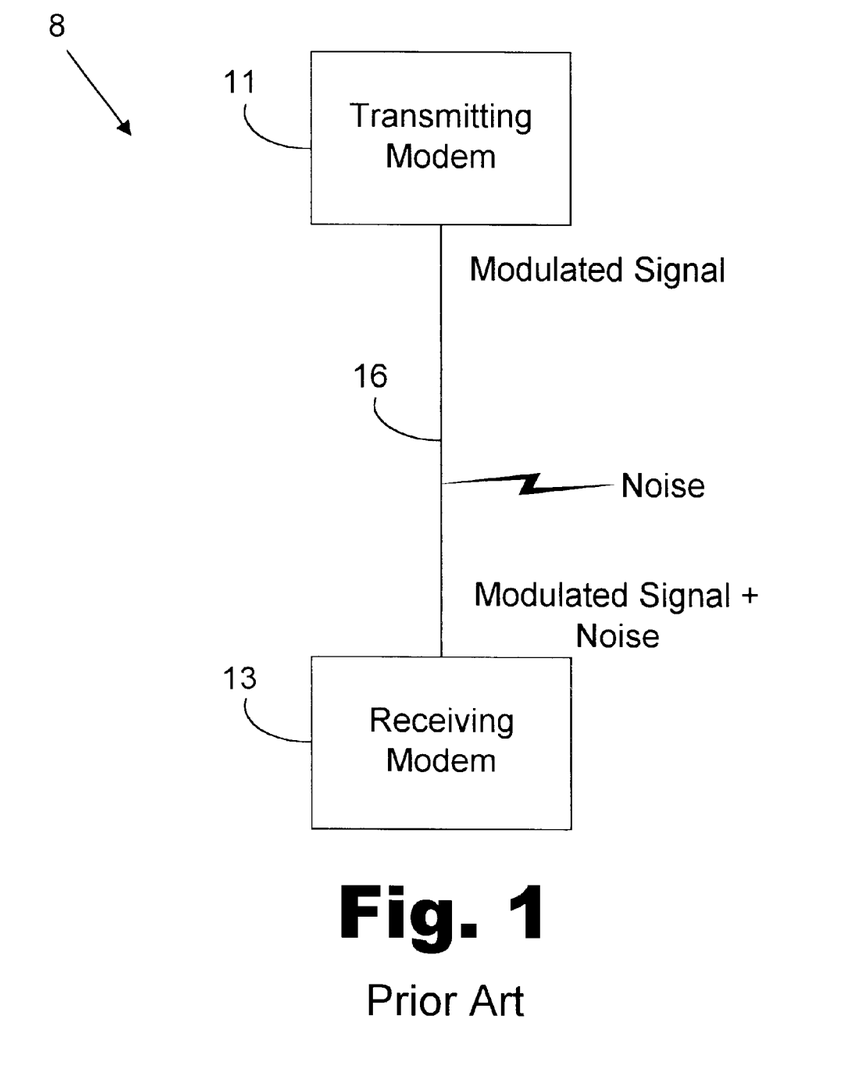
FIG. 1 is a block diagram of a prior art xDSL communication system.

A general model for a prior art xDSL communication system 8 is illustrated in the block diagram of FIG. 1. The system comprises a transmitting modem 111 and a receiving modem 13 that communicate with one another over an xDSL 16. Transmitting modem 11, through the use of a modulator, uses a message signal, generally known as a modulating or baseband signal, to modulate a carrier signal to produce what is commonly referred to as a modulated signal. As in any data transmission event, however, the signal received by a demodulator at receiving modem 13 will consist of the modulated signal, modified by distortions imposed by the transmission system, plus noise that is inserted between transmission and reception.

Noise can be divided into four categories: thermal noise, intermodulation noise, crosstalk and impulse noise. Thermal noise is due to thermal agitation of electrons in a conductor and is a function of temperature. This type of noise is present in all electronic devices and transmission media and is usually referred to as white noise, inasmuch as it is uniformly distributed across the frequency spectrum. A second type of noise, known as intermodulation noise, occurs when signals at different transmission frequencies share the same transmission medium. The effect of intermodulation noise is to produce signals at a frequency that is the sum or difference of two original frequencies. Crosstalk, which was discussed hereinbefore, can be broadly described as the unwanted coupling of signals between signal paths. The last type of noise, impulse noise, is the most unpredictable. Impulse noise consists of irregular pulses or noise spikes of short duration that are typically generated from external electromagnetic sources such as lightning, electric machinery and/or faults and flaws in the communication system.

Measures can be taken to counteract or at least minimize the effects of intermodulation and crosstalk noise, but thermal and impulse noise are ever present in virtually any electronic, copper based communication system. Therefore, for demodulator 20 to demodulate the modulated signal to obtain the original message signal, the ratio of the modulated signal power to the noise signal power must exceed a certain level. Typically, this ratio is referred to as the signal-to-noise (S/N) ratio and is reported in decibels according to EQ. 1 as follows:

$$(S/N)_{dB} = 10 \log (\text{signal power/noise power}) \qquad \text{EQ. 1}$$

Moreover, the maximum rate at which data can be transmitted across xDSL 16 is directly related to the logarithm of the ratio of the signal power to the noise power on the channel as expressed in EQ. 2 where the data rate is expressed in bits per second and W represents the bandwidth of the channel in hertz as follows:

$$\text{data rate}_{bps} = W \log_2(1 + (\text{signal power/noise power})) \qquad \text{EQ. 2}$$

Nevertheless, simply boosting the transmit power level at transmitting modem 11 to its maximum value to support the high data rates of an xDSL communication session may result in unnecessary power consumption for data sessions running at lower throughputs as discussed hereinbefore. The present invention overcomes this problem through dynamic adaptation of the transmission power level.

Figure 2:
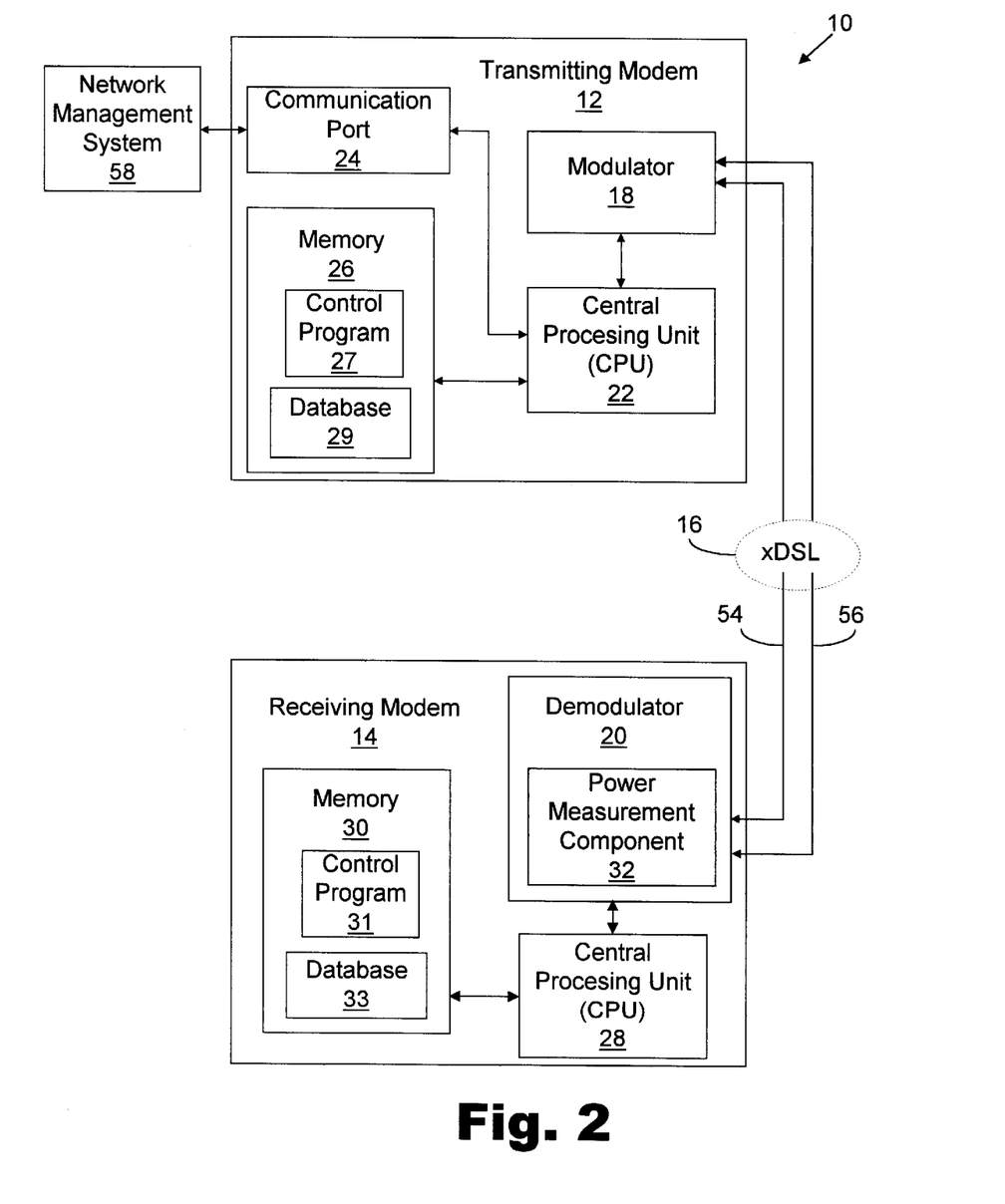
FIG. 2 is a detailed block diagram of the xDSL performance customization system in accordance with the present invention.
Figure 3:
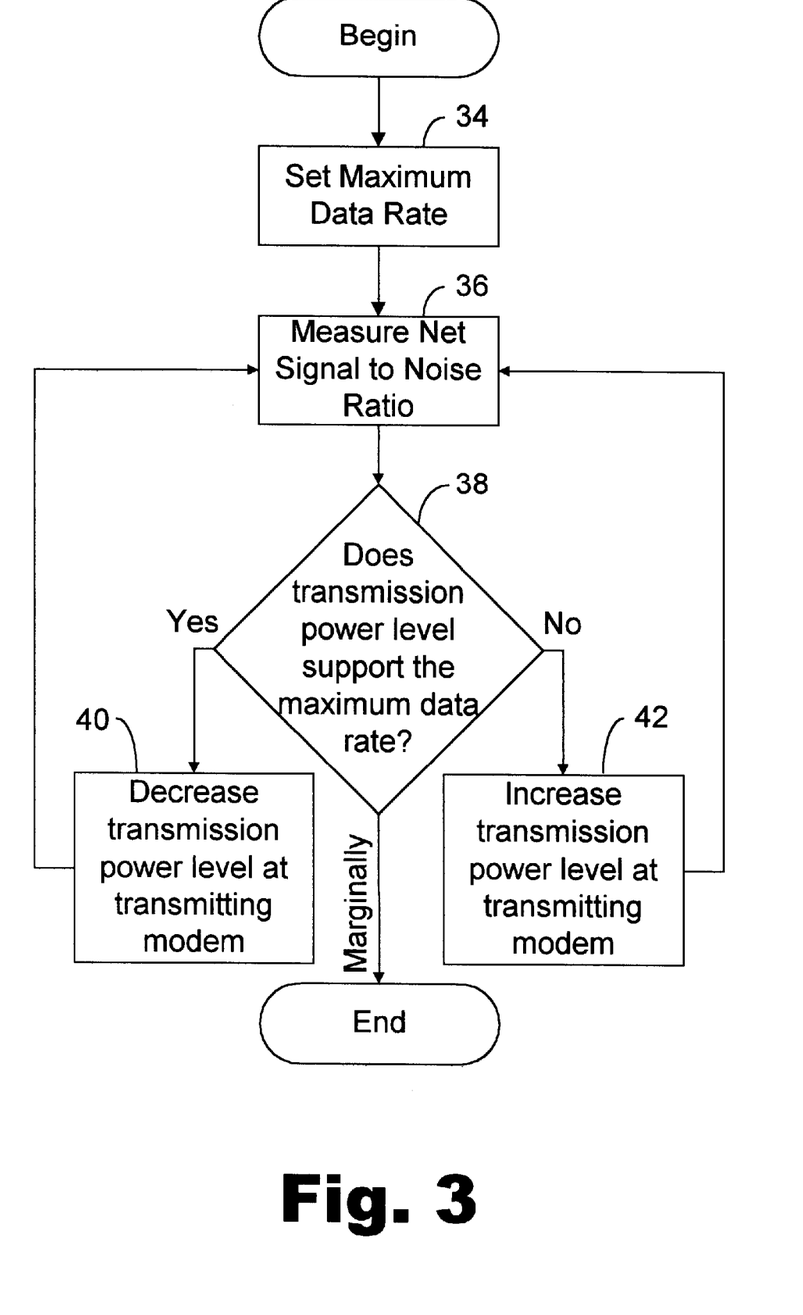
FIG. 3 is a transmit power level optimization flow chart for the xDSL performance customization system of FIG. 2.

With reference now to FIGS. 2 and 3, transmission power adaptation according to the present invention will be discussed. The simplex communication system 10 of FIG. 2, comprising transmitting modem 12 and receiving modem 14, is used for simplicity. The principles discussed herein can readily be extended to a duplex environment. According to the xDSL communication system 10 depicted in FIG. 2, transmitting modem 12 comprises a central processing unit (CPU) 22 in communication with modulator 18, communication port 24 and memory 26. Memory 26 holds software control program 27 and database 29. Similarly, receiving modem 14 comprises CPU 28 in communication with demodulator 20 and memory 30. Memory 30, likewise holds software control program 31 and database 33. Demodulator 20 also comprises power measurement component 32. Control programs 27 and 31, in conjunction with databases 29 and 33, are executed by CPUs 22 and 28 and provide the control logic for the processes to be discussed herein.

FIG. 3 provides a flow chart for transmit power adaptation according to the present invention. The process begins with step 34 in which a maximum data rate is negotiated between transmitting modem 12 and receiving modem 14. This negotiation can be carried out in a variety of ways. For example, receiving modem 14 could maintain a table of possible data rates in database 33, one of which is retrieved by control program 31 and then transmitted to transmitting modem 12 as part of an initialization procedure. Similarly, control program 27 in transmitting modem 12 could select a data rate from a table stored in database 29 for transmission to receiving modem 14 as part of an initialization procedure. Regardless of which modem initiates the establishment of the maximum data rate, the two modems can exchange messages according to any desired protocol until a mutually agreed upon rate is arrived at.

Once a maximum data rate has been established, receiving modem 14 will determine the net S/N ratio. Again, this determination can be made using a variety of well known techniques. One common technique is for transmitting modem 12 to cease transmission for a specified period. During this silent period, power measurement component 32 reads the noise present on xDSL 16 and calculates the power spectral density (PSD) of the noise. Following the silent period, transmitting modem 12 transmits a test pattern of data at a default power level allowing power measurement component 32 to calculate the PSD of the modulated signal plus noise. The previously calculated noise component can then be subtracted from the combined noise plus signal measurement to compute the net S/N ratio.

In step 38, receiving modem 14 determines whether the previously calculated S/N ratio will support the data rate originally arrived at in step 34. Typically, this process will involve control program 31 indexing a table stored in database 33 in which minimum S/N ratios are correlated with a list of possible data transmission rates and retrieving the minimum S/N ratio required for the current data rate. This table can be constructed using EQ. 2, which was set forth previously. It should be noted, however, that EQ. 2 provides a theoretical maximum in which only thermal or white noise is accounted for. In practice, due to impulse noise, crosstalk, attenuation and delay distortion, the maximum throughput that can actually be achieved will be less. Therefore, the data rates entered into the table should be reduced by a suitable amount to account for these additional factors.

Control program 31 then compares the calculated S/N ratio with the minimum required S/N ratio retrieved from database 33. If the calculated S/N ratio exceeds the minimum required SIN ratio by more than a specific margin, receiving modem 14 will send a message to transmitting modem 12 requesting that the transmission power be decreased in step 40. As part of this message, receiving modem 14 could request a specific transmit power value or, for simplicity, transmitting modem 12 could be instructed to simply drop down to the next lower value in a table of possible transmit power levels stored in database 29. If the calculated S/N ratio falls below the minimum required ratio by more than a specific margin, receiving modem 14 will send a message to transmitting modem 12 requesting that the transmission power be increased in step 42. Again, receiving modem 14 could request a specific transmit power value or, alternatively, transmitting modem 12 could simply move up to the next higher value in a table of possible transmit power levels. If transmitting modem is instructed to merely increment or decrement its transmit power to the next available level, the process will repeat itself in iterative fashion beginning with step 36 until the calculated S/N ratio falls within a predetermined range or margin about the minimum required ratio. This range or margin ensures that the two modems don't endlessly chase one another in trying to close in on a satisfactory power level to support a specific data rate. Alternatively, if transmitting modem 12 is provided with an absolute transmit power value from receiving modem 14, the process should complete after one iteration.

It will be appreciated by those skilled in the art that more advanced and precise techniques can be used to calculate the minimum transmit power level that will support a given data rate. For example, transmitting modem 12 could transmit a test data pattern at a starting power level which would then be verified by receiving modem 14 using any well known error detection technique. If the test pattern has fewer than a certain minimum threshold of bit errors, receiving modem 14 would instruct transmitting modem 12 to decrease the transmit power. Conversely, if the test pattern has more than the minimum threshold of bit errors, transmitting modem 12 would be instructed to increase the transmit power. Through successive iterations of this procedure, the transmit power should end up at the level that just supports the data rate.

Figure 4:
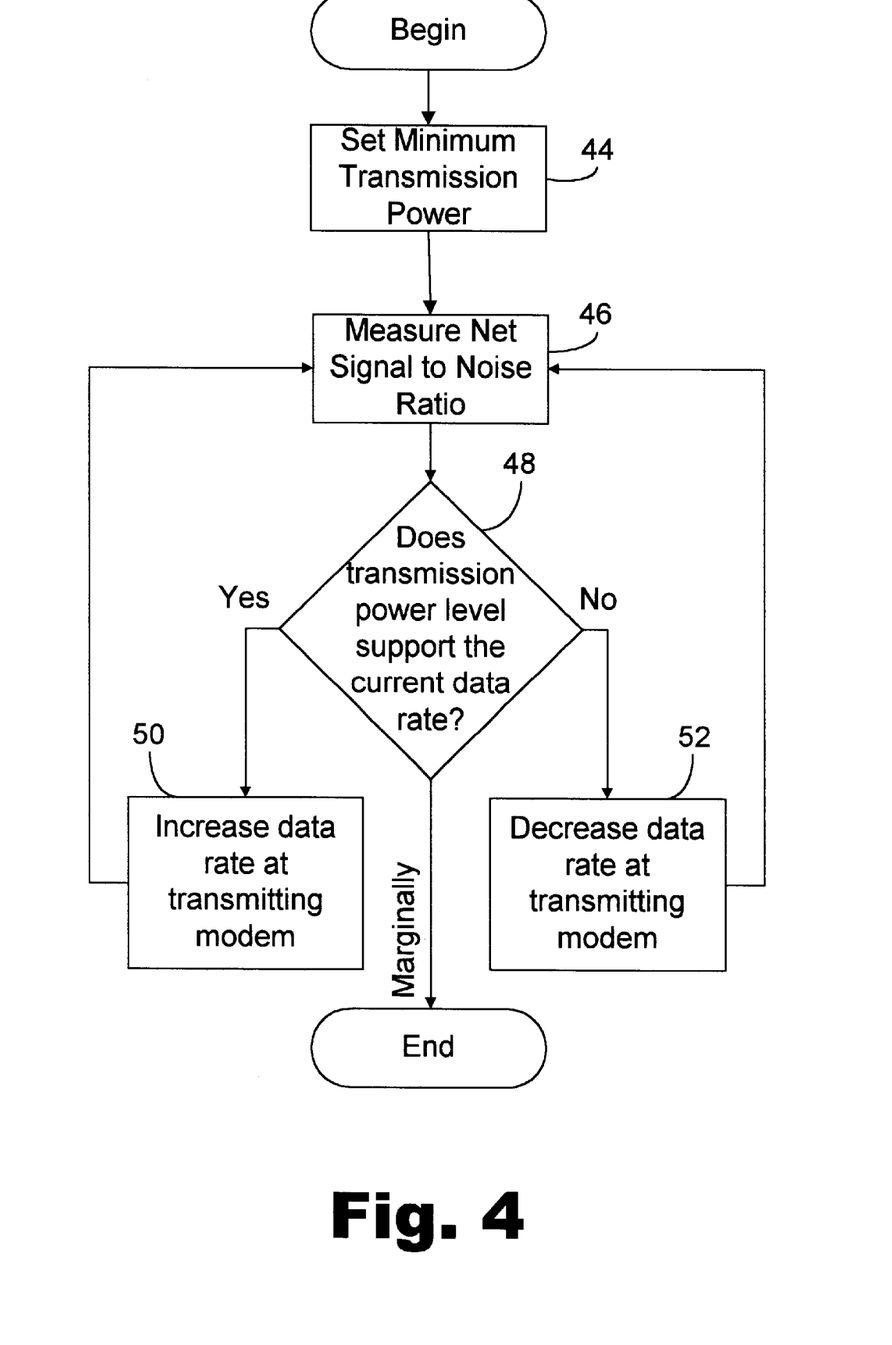
FIG. 4 is a data rate optimization flow chart for the xDSL performance customization system of FIG. 2.

The example of FIG. 3 is directed towards adapting or minimizing the transmission power level for a fixed data rate. Conversely, there will be circumstances, as discussed hereinbefore, where it is desirable to fix the transmission power level and then adapt or maximize the data rate for that power level. FIG. 4 provides a flow chart for data rate adaptation according to the present invention.

Referring now to FIGS. 2 and 4, the process begins with step 44 in which a minimum transmission power is negotiated between transmitting modem 12 and receiving modem 14. This negotiation can be carried out using the same approach discussed earlier with respect to data rate negotiation. That is, one or both of modems 12 and 14 could maintain tables in memories 26 and/or 30 that contain valid transmission power levels. One of the two modems 12 and 14 will propose a transmission power level to the other modem during an initialization procedure, and, using any desired protocol, the modems will exchange messages to arrive at an agreed upon minimum transmission power level.

Now that the minimum transmission power level has been established, receiving modem 14 will determine the net S/N ratio in step 46 in the same manner as discussed earlier with respect to step 36 of FIG. 3. During step 46, control program 27 in transmitting modem 12 will choose a default data rate, which is stored in database 29, for use as a starting point in the adaptation process. This initial data rate will then be transmitted to receiving modem 14 in a message.

In step 48, receiving modem 14 determines whether the calculated S/N ratio will support the initial data rate set by transmitting modem 12. Receiving modem 14 follows a similar procedure as that described earlier with respect to step 38 of FIG. 3. First, control program 31 uses the calculated S/N ratio to index the table stored in database 33 in which minimum S/N ratios are correlated with a list of possible data transmission rates and retrieves a maximum data rate. As part of the indexing procedure, control program 31 compares the calculated S/N ratio with the minimum required S/N ratio entries stored in database 33. When the calculated S/N ratio falls within a certain range or margin about a particular S/N ratio entry, the data rate associated with that entry will be retrieved. The margin or range value will be chosen based on the granularity of entries in the database to allow control program 31 to converge upon a choice. The margin or range is necessary because the calculated S/N ratio will rarely correspond exactly to a table entry.

Next, if the data rate retrieved from the table is greater than the initial data rate set by transmitting modem 12, receiving modem 14 could request in step 50 that transmitting modem 12 increase the data rate to the retrieved value or, alternatively, transmitting modem 12 could be instructed to simply increment the data rate to the next higher value in a table of possible data rates stored in database 29. On the other hand, if the data rate retrieved from the table is less than the initial data rate set by transmitting modem 12, receiving modem 14 could request in step 52 that transmitting modem 12 decrease the data rate to the retrieved value or, alternatively, transmitting modem 12 could be instructed to simply decrement the data rate to the next lower value in a table of possible data rates stored in database 29.

Similar to the case of transmit power adaptation, if transmitting modem 12 is instructed to merely increment or decrement the data rate to the next available level, the data rate adaptation process will repeat itself in iterative fashion beginning with step 48 until the transmitted data rate converges upon the rate retrieved from the table in database 33. Alternatively, if transmitting modem 12 is provided with an absolute data rate value from receiving modem 14, the process should complete after one iteration.

While it is possible to practice both the transmit power adaptation method of FIG. 3 and the data rate adaptation method of FIG. 4 using in-band messaging between the two modems (i.e., using xDSL data channel 54), in the preferred embodiment, embedded operational channel 56 (EOC) will be used instead. EOC 56 provides a low speed secondary channel on xDSL 16 that allows the aforementioned methods to be practiced simultaneously with ongoing data transmission. Instead of sending test data to calculate a S/N ratio at receiving modem 14, a S/N ratio can be calculated from a data transmission from an actual communication session.

Also, a typical application of the present invention will involve one of the two modems 12 and 14 being located at a central office (CO) or remote terminal (RT) site with the other modem being located at a customer site. This configuration allows the modem located at the CO, which, in FIG. 2, is transmitting modem 12, to be managed by network management system 58, external to the transmitting modem 12 as illustrated in FIG. 2. Through network management system 58, the tables that comprise databases 29 and 33 can be downloaded through communication port 24 and periodically updated according to the current xDSL application. The modem located at the customer site, which is receiving modem 14 in the present example, can download the tables it needs for database 33 from transmitting modem 12. Moreover, a technician can enter a particular performance parameter to be optimized (e.g., transmission power level or data throughput) and fix values for parameters that will not be optimized through network management system 58. Network management system 58 effectively eliminates negotiation steps 34 and 44 of FIGS. 3 and 4 respectively, in which the modems themselves select which performance parameters will receive fixed values and which performance parameter will be optimized. Accordingly, in one embodiment, the network management system 58 performs the selecting and fixing steps.

It will be appreciated by those skilled in the art that the functionality provided through control programs 27, 31 and databases 29, 33 can also be implemented through hardware (e.g., an application specific integrated circuit (ASIC) and supporting circuitry). Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

Further, the present invention comprising control programs 27, 31 and databases 29, 33 can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

Thus far, the principles of the present invention have been applied to a single pair of modems communicating in isolation. The advantages of the present invention, however, are perhaps most impressive when these principles are applied to a modem pool environment.

As discussed earlier, crosstalk is one of the primary sources of noise in a communication system. Moreover, crosstalk is particularly debilitating in a modem pool environment where many xDSL loops and other circuits are bundled together in the same cable binder, which is standard practice in a CO. While increasing signal transmission power can improve the S/N ratio in a communication system, it unfortunately comes with the negative side effect of enhancing crosstalk with a neighboring system.

Figure 5:
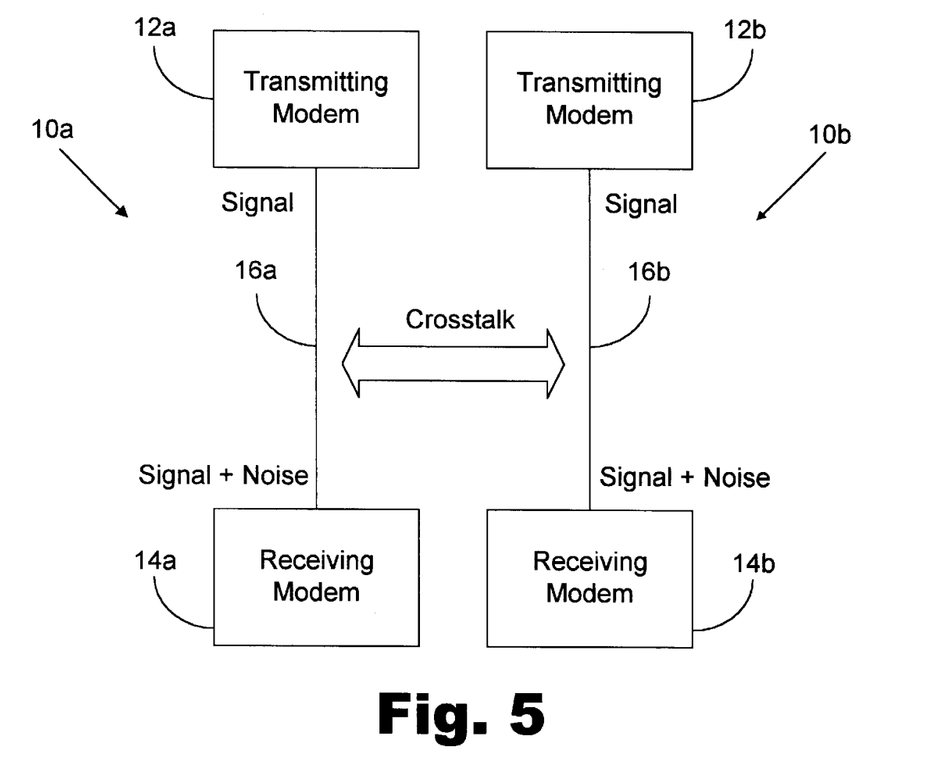
FIG. 5 is a block diagram illustrating the application of the xDSL performance customization system in an environment where multiple xDSL loops are bundled together.

The present invention can optimize the performance of an entire modem pool system by reducing crosstalk stemming from unnecessary transmit power levels. Referring now to FIG. 5, a communication system is shown in which a first pair 10a of modems 12a and 14a communicating over xDSL 16a and a second pair 10b of modems 12b and 14b communicating over xDSL 16b suffer from crosstalk. The crosstalk results from xDSLs 16a and 16b being bundled together at one end in the same cable binder. Now, suppose transmitting modem 12a of first pair 10a is operating at a transmit power level that is greater than the minimum needed to support the current data rate. First pair 10a can then achieve a lower transmission power level using the process of FIG. 3 as described herein. The reduction in transmission power by first pair 10a has the effect of reducing the level of crosstalk noise that bleeds into second pair 10b. Therefore, second pair 10b can likewise negotiate a lower transmission power level because of the reduction in crosstalk even if second pair 10b was currently operating at an optimum performance level (i.e., the transmission power is marginally sufficient to support the current data rate). In theory, this process could go on in perpetuity with both pairs alternately negotiating transmit power level reductions; however, this would be possible only in a system where crosstalk is the only noise component. In all practical systems, there will always be non-crosstalk noise that will place a lower limit on transmission power levels. Nevertheless, in systems in which crosstalk is the dominating noise factor, the power savings can be dramatic.

In the example just described, second pair 10b, which was initially operating at a marginal performance level, reduced its transmission power while maintaining its current data rate or throughput in response to the transmission power reduction by first pair 10a. Alternatively, second pair 10b could opt instead to increase its data rate using the process of FIG. 4 as previously discussed. In that circumstance, the entire system will enjoy an overall performance improvement comprising both a reduction in power consumption and an increase in throughput. It should be noted that in a multiple xDSL system, such as a modem pool, at least one of the individual communication links (e.g., pairs in the preceding example) must be operating above its marginal performance level. That is, it must be using a transmission power level greater than the level necessary to support its current data rate. For systems comprising many communication pairs, a thorough performance improvement analysis would be highly complex and thus require a computer simulation. Nevertheless, it should be clear to the skilled practitioner that the performance of a large xDSL modem pool system can be tuned to attain a desired performance improvement through selective application of transmission power and data rate adaptation according to the present invention. Advantageously, network management system 58 can be used extensively by a technician to target those communication links that will benefit the most from power and/or data rate adaptation.

Note that through selective application of the xDSL performance customization principles discussed herein, the performance variance between xDSL communication pairs can be reduced. For example, recall the foregoing discussion with reference to FIG. 5 in which the second modem pair 10b had the option of undertaking a transmission power reduction or increasing its data rate in response to a transmit power reduction by the first modem pair 10a. Thus, assuming the first modem pair 10a was transmitting at a higher data rate than the second modem pair 10b, the throughput performance variance between the two pairs can be reduced by increasing the data rate of modem pair 10b.

The present invention has been discussed as applied generally to an xDSL comprising a data channel 54 and an EOC 56 (see FIG. 2). The principles disclosed, however, can be extended to the lower level modulation techniques used in xDSL signaling. For example, rather than merely adapting transmission power uniformly across the entirety of the transmission spectrum, a frequency dependent version of the present invention can be implemented in which the same principles are applied to selected sub-bands within the spectrum. The concepts remain the same, except the receiver will now measure the net S/N ratio in each sub-band individually and negotiate the transmission power level and/or data rate within only that band of the xDSL data channel. This approach would be preferred for those xDSL systems using Discrete Multi-Tone (DMT) modulation in which the available bandwidth is divided into a set of independent, orthogonal sub-channels and then data is assigned to each sub-channel according to the channel quality. Similarly, the present invention can be applied to baseband systems by combining transmission power adaptation with precoding and adaptive pre-emphasis in which some parts of the signal are attenuated and other amplified according to frequency.

In the examples presented, two variables, transmission power level and data rate, were used as the optimization criteria. The present invention is not limited to the optimization of these two variables, however. Loop length is a third variable that can be optimized using the system and method of the present invention. It is well known that channel attenuation increases as a loop length increases. Thus, longer loop lengths will require a corresponding increase in transmission power level if the same data rate is to be maintained. The present invention provides the skilled practitioner with the flexibility of weighing such performance factors as power consumption, throughput and loop length in an xDSL communication against one another to develop a customized system having a performance profile tailored to the needs of a particular customer base. As customer needs change, the performance of the system can easily be altered to accommodate any new requirements.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A digital subscriber line (DSL) modem receiver having customizable performance characteristics, comprising:
   means for negotiating a performance parameter for optimization;
   means for determining a signal to noise ratio;
   means for selecting a transmission data rate from a table such that a data rate is established between a DSL modem transmitter and said DSL modem receiver based upon said signal to noise ratio; and
   means for requesting an adjustment in said performance parameter based on said signal to noise ratio.

2. The modem receiver of claim 1, wherein said performance parameter is selected from the group consisting of said data rate and a transmission power level.

3. The modem receiver of claim 1, wherein said means for determining comprises means for measuring a power spectral density of a signal on a digital subscriber line (DSL).

4. A method for customizing the performance characteristics of a digital subscriber line (DSL) modem receiver, comprising the steps of:
   negotiating a performance parameter for optimization;
   determining a signal to noise ratio;
   selecting a transmission data rate from a table such that a data rate is established between a DSL modem transmitter and said DSL modem receiver based upon said signal to noise ratio; and requesting an adjustment in said performance parameter based on said signal to noise ratio.

5. The method of claim 4, wherein said negotiating step comprises the steps of:
selecting said performance parameter from a plurality of possible performance parameters; and
fixing a value for each of said possible performance parameters not selected.

6. The method of claim 5, wherein said selecting and fixing steps are performed by a network management system.

7. The method of claim 5, wherein said performance parameter is selected from the group consisting of said data rate and a transmission power level.

8. The method of claim 4, wherein said modem receiver receives data on a plurality of sub-bands and wherein said negotiating and determining steps are performed for each sub-band used.

9. A digital subscriber line (DSL) modem transmitter having customizable performance characteristics, comprising:
means for negotiating a performance parameter for optimization;
means responsive to an adjustment request for said performance parameter;
means for selecting a transmission data rate from a table such that a data rate is established between said DSL modem transmitter and a DSL modem receiver based upon a signal to noise ratio; and
means for adjusting said performance parameter.

10. The DSL modem transmitter of claim 9, wherein said performance parameter is selected from the group consisting of said data rate and a transmission power level.

11. A method for customizing the performance characteristics of a digital subscriber line (DSL) modem transmitter, comprising the steps of:
negotiating a performance parameter for optimization;
receiving a performance parameter adjustment request signal;
selecting a transmission data rate from a table such that a data rate is established between said DSL modem transmitter and a DSL modem receiver based upon a signal to noise ratio; and
adjusting said performance parameter.

12. The method of claim 11, wherein said negotiating step comprises the steps of:
selecting said performance parameter from a plurality of possible performance parameters; and
fixing a value for each of said possible performance parameters not selected.

13. The method of claim 12, wherein said selecting and fixing steps are performed by a network management system.

14. The method of claim 12, wherein said performance parameter is selected from the group consisting of said data rate and a transmission power level.

15. The method of claim 11, wherein said DSL modem transmitter transmits data using a plurality of sub-bands and wherein said negotiating and adjusting steps are performed for each sub-band used.

16. A method for customizing the performance of a communication system, said system comprising a transmitting modem and a receiving modem in communication over a digital subscriber line (DSL), said method comprising the steps of:
negotiating a performance parameter for optimization;
determining a signal to noise ratio at said receiving modem;
selecting a transmission data rate from a table such that a data rate is established between said transmitting modem and said receiving modem based upon said signal to noise ratio;
said receiving modem requesting said transmitting modem to make an adjustment in said performance parameter based on said signal to noise ratio; and
adjusting said performance parameter at said transmitting modem.

17. The method of claim 16, wherein said negotiating step comprises the steps of:
selecting said performance parameter from a plurality of possible performance parameters; and
fixing a value for each of said possible performance parameters not selected.

18. The method of claim 17, wherein said selecting and fixing steps are performed by a network management system.

19. The method of claim 17, wherein said performance parameter is selected from the group consisting of said data rate and a transmission power level.

20. The method of claim 16, further comprising the step of:
repeating said determining, requesting and adjusting steps in iterative fashion until said system operates at a data rate marginally supported by a transmission power level.

21. The method of claim 16, wherein said negotiating and requesting steps are performed using signaling on a low speed secondary channel.

22. The method of claim 16, wherein data are transmitted from said transmitting modem to said receiving modem using a plurality of sub-bands and wherein said negotiating, determining, requesting and adjusting steps are performed for each sub-band used.

23. A method for customizing the performance of a communication system, said system comprising a first modem pair consisting of a first transmitting modem and a first receiving modem in communication with each other over a first digital subscriber line (DSL) and a second modem pair consisting of a second transmitting modem and a second receiving modem in communication with each other over a second DSL, said first and second DSLs affecting one another with crosstalk, said method comprising the steps of:
selecting a first data rate from a table, said first data rate corresponding to a transmission data rate between said first transmitting modem and said first receiving modem;
determining a first signal to noise ratio at said first receiving modem;
said first receiving modem requesting said first transmitting modem to reduce a first transmission power level based on said first signal to noise ratio;
reducing said first transmission power level at said first transmitting modem until said first data rate between said first transmitting modem and said first receiving modem is marginally supported;
negotiating a second transmission power level between said second transmitting modem and said second receiving modem;
determining a second signal to noise ratio at said second receiving modem;

said second receiving modem requesting said second transmitting modem to increase a second data rate based on said second signal to noise ratio; and increasing said second data rate between said second transmitting modem and said second receiving modem until said second data rate between said second transmitting modem and said second receiving modem is marginally supported.

24. A method for customizing the performance of a communication system, said system comprising a first modem pair consisting of a first transmitting modem and a first receiving modem in communication with each other over a first digital subscriber line (DSL) and a second modem pair consisting of a second transmitting modem and a second receiving modem in communication with each other over a second DSL, said first and second DSLs affecting one another with crosstalk, said method comprising the steps of:

selecting a first data rate from a table, said first data rate corresponding to a transmission data rate between said first transmitting modem and said first receiving modem;

determining a first signal to noise ratio at said first receiving modem;

said first receiving modem requesting said first transmitting modem to reduce a first transmission power level based on said first signal to noise ratio;

reducing said first transmission power level at said first transmitting modem until said first data rate between said first transmitting modem and said first receiving modem is marginally supported;

negotiating a second data rate between said second transmitting modem and said second receiving modem;

determining a second signal to noise ratio at said second receiving modem;

said second receiving modem requesting said second transmitting modem to reduce a second transmission power level based on said second signal to noise ratio; and reducing said second transmission power level at said second transmitting modem until said second data rate between said second transmitting modem and said second receiving modem is marginally supported.

25. The method of claim 24, further comprising the step of:

repeating said determining, requesting and reducing steps on said first modem pair and said second modem pair in iterative fashion until said transmission power levels on each modem pair marginally support said data rates on each modem pair.

26. The method of claim 24, wherein data are transmitted between said modems in said modem pairs using a plurality of sub-bands and wherein said selecting, determining, requesting and reducing steps are performed for each sub-band used.

27. A digital subscriber line (DSL) communication system having customizable performance characteristics, comprising:

means for negotiating a performance parameter for optimization between a transmitting modem and a receiving modem;

means for determining a net signal to noise ratio at said receiving modem;

means for selecting a transmission data rate from a database table such that a data rate is established between said transmitting modem and said receiving modem based upon said net signal to noise ratio;

means for requesting said transmitting modem to make an adjustment in said performance parameter based on said net signal to noise ratio; and means for adjusting said performance parameter at said transmitting modem.

28. The system of claim 27, said performance parameter is selected from the group consisting of said data rate and a transmission power level.

29. The system of claim 27, wherein said means for determining comprises means for measuring a power spectral density of a signal on a digital subscriber line (DSL).

* * * * *

UNITED STATES PATENT AND TRADEMARK OFFICE
CERTIFICATE OF CORRECTION

PATENT NO.      : 6,647,058 B1                                    Page 1 of 1
DATED           : November 11, 2003
INVENTOR(S)     : Bremer et al.

It is certified that error appears in the above-identified patent and that said Letters Patent is hereby corrected as shown below:

<u>Column 4,</u>
Line 13, after the word "modem" delete the phrase "1|1" and substitute therefor
-- 11 --.

Signed and Sealed this

Sixth Day of January, 2004

JAMES E. ROGAN
*Director of the United States Patent and Trademark Office*